United States Patent [19]

Fuller et al.

[11] Patent Number: 5,423,051

[45] Date of Patent: Jun. 6, 1995

[54] EXECUTION UNIT WITH AN INTEGRATED VECTOR OPERATION CAPABILITY

[75] Inventors: Richard A. Fuller, West Hurley; Arun K. Ghose, Hyde Park; Faith W. Sell, Saugerties; Michael S. Siegel, Hyde Park, all of N.Y.

[73] Assignee: International Business Machines Corporation, Armonk, N.Y.

[21] Appl. No.: 951,490

[22] Filed: Sep. 24, 1992

[51] Int. Cl.[6] .................... G06F 9/30; G06F 9/38; G06F 9/40

[52] U.S. Cl. .................... 395/800; 364/232.21; 364/232.22; 364/232.23; 364/244.3; 364/262.4; 364/262.9; 364/263.3; 364/271.4; 364/DIG. 1; 364/DIG. 2; 395/375

[58] Field of Search .............. 395/800, 400, 425, 375, 395/500, 200, 650, 575, 325, 775, 600, 725, 250; 364/DIG. 1, DIG. 2, 736, 748

[56] References Cited

U.S. PATENT DOCUMENTS

| | | | |
|---|---|---|---|
| 4,780,811 | 10/1988 | Aoyama et al. | 395/800 |
| 4,928,238 | 5/1990 | Sekiguchi | 395/800 |
| 4,949,247 | 8/1990 | Stephenson et al. | 395/800 |
| 4,964,035 | 10/1990 | Aoyama | 395/800 |
| 4,967,343 | 10/1990 | Ngai et al. | 395/800 |
| 4,994,996 | 2/1991 | Fossum et al. | 364/748 |
| 5,008,812 | 4/1991 | Bhandarkar et al. | 395/375 |
| 5,019,969 | 5/1991 | Izumisawa et al. | 395/800 |
| 5,038,312 | 8/1991 | Kojima | 364/736 |
| 5,053,631 | 10/1991 | Perlman et al. | 364/748 |
| 5,053,987 | 10/1991 | Genusov et al. | 364/736 |
| 5,073,970 | 12/1991 | Aoyama et al. | 395/800 |
| 5,226,171 | 7/1993 | Hall et al. | 395/800 |
| 5,261,113 | 11/1993 | Jouppi | 395/800 |

*Primary Examiner*—Alyssa H. Bowler
*Assistant Examiner*—Daniel H. Pan
*Attorney, Agent, or Firm*—Lynn L. Augspurger; C. Lamont Whitham

[57] ABSTRACT

A vector operation capability is integrated into the execution unit (E-Unit) portion of a computing systems central processing unit (CPU) designed to support scalar instruction processing. The fixed point and floating point instruction functional units in the E-Unit that are required to implement the vector instruction set are pipelined. A set of vector registers are added to the architected data registers contained in the E-Unit. The E-Unit control logic is modified to queue and schedule both vector and scalar instructions, The E-Unit's load and store unit bandwidth capability to support the transfer of the contiguous blocks of data normally associated with vector processing are enhanced. The integrated vector and scalar capability allows for improved processing of programs that include both vector and scalar type instructions.

14 Claims, 6 Drawing Sheets

EXECUTION UNIT WITH AN INTEGRATED VECTOR OPERATION CAPABILITY

BACKGROUND OF THE INVENTION

1. Field of the Invention

The invention relates generally to methods and apparatus for performing both scalar and vector operations in a digital computing system. More particularly, the invention relates to methods and apparatus for integrating a vector operation capability into the execution unit (sometimes referred to herein as an "E-Unit") portion of a computing system's central processing unit ("CPU"). Such units (CPUs and E-Units) are typically designed to support the processing of scalar instructions in a single instruction single data ("SISD") and/or multiple instruction single data ("MISD") mode of operation. Special purpose vector processing facilities, usually in the form of a coprocessor attached to the CPU, are required to process vector instructions in a single instruction multiple data ("SIMD") mode of operation.

One specific aspect of the invention relates to an improved CPU that includes an E-Unit having a vector processing system integrated therein (in addition to normal scalar instruction processing capabilities commonly supported by such units).

According to this aspect of the invention, the vector processing capability may be integrated into an E-Unit designed to support scalar instruction processing by (a) pipelining the fixed point and floating point instruction functional units (in the E-Unit), that are required to implement the vector instruction set; (b) adding a set of vector registers to, the architected data registers contained in the E-Unit; (c) modifying E-Unit control logic to queue and schedule both vector and scalar instructions; and (d) enhancing the E-Unit's load and store unit bandwidth capability to support the transfer of the contiguous blocks of data normally associated with vector processing.

Further aspects of the invention relate to improved methods (for use in general purpose digital computing systems), for processing a stored program that includes both vector and scalar type instructions; and an execution unit per se (something less than an entire CPU), built in accordance with the teachings of the invention, that supports both vector and scalar data processing using single data and instruction paths.

2. Description of the Prior Art

In commercially available computing systems, such as the ESA 9000 model 9021-900 manufactured by IBM ("IBM" is a registered trademark owned by the International Business Machines Corporation), a vector processing facility in the form of a coprocessor may be attached to the CPU to process vector instructions. The ESA 9000 is fully described in published reference documents including the "ES/9000 Reference Guide" (Manual No. G3209996), published by IBM, hereby incorporated by reference.

The E-Unit portion of the CPU in an ESA 9000 (and most commercially available systems), is responsible for processing scalar instructions while the vector processing facility (the coprocessor)l is independently responsible for processing vector instructions using separate instruction and data paths.

Utilizing techniques that are well known to those skilled in the art, an instruction unit ("I-Unit") portion of a CPU (like the ESA 9000 CPU), fetches instructions from memory, decodes the instructions and whenever a vector instruction is decoded, sends the instruction (or more precisely an image of the instruction including op code and information concerning where in storage to get operands from), to the vector coprocessor. Scalar instruction images are passed directly to the aforementioned E-Unit for processing.

Many of the same functions are performed by the vector coprocessor and the E-Unit portion of the CPU once an instruction and relevant data are presented for processing.

In particular, each facility has (in a data path); (a) a load unit used to move data from storage to either a data register or a functional unit such as an adder, multiplier, etc.; (b) an "architected" data register pool, that is a set of storage elements with a prescribed use that can only be manipulated through the use of instructions (such as general purposes registers, arithmetic registers, control registers, etc., and in the case of the vector coprocessor an additional set of storage elements known as vector registers); (c) various arithmetic and logical functional units for either SISD of MISD operations (for E-Units), and functional units that support SIMD operations (for vector coprocessors); (d) internal working registers (within each functional unit) to provide the required working storage for the particular function performed by a given functional unit; and (e) a store unit used to move data to storage from either a data register or the functional units.

Additionally, each facility has (in an instruction path) control means for queuing instructions and scheduling instruction execution by an appropriate functional unit.

Since many of the aforementioned components in a vector coprocessor and an E-Unit are duplicated, it would be desirable to be able to integrate the vector facility into the E-Unit to reduce hardware costs, processing time and to reduce the number of instruction and data paths required to support the processing of both vector and scalar instructions.

Prior art systems are known in which portions of the aforementioned CPU functions and coprocessor functions are combined; however no system is known where vector and scalar instruction processing is integrated in a single E-Unit having a single instruction path and a single data path.

The prior art includes many examples of vector coprocessors per se, improvements made to these processors to improve throughput, the bandwidth between such processors and storage, and the sharing of certain logic components to synchronize the operation of separate vector and scalar processors.

For example, U.S. Pat. No. 4,780,811, to Aoyama et al., entitled "Vector Processing Apparatus Providing Vector And Scalar Processor Synchronization", describes vector processor apparatus that includes a scalar processor for executing scalar instructions and a separate vector processor for processing vector instructions. This reference teaches the use of a common status register (for detecting instruction completion) that can be accessed by both processors. However, the vector and scalar processing functions themselves are not integrated; i.e., separate logic is still required for each of the processors per se.

In U.S. Pat. No. 5,053,987, to Genusov et al., entitled, "Arithmetic Unit In A Vector Signal Processor Using Pipelined Computational Blocks", an arithmetic unit is taught for a vector signal processor implementing the IEEE Standard 754 for Floating-Point Arithmetic. The arithmetic unit includes three pipelined floating-point computational blocks for high computation throughput.

Although describing a pipelined functional unit included in a vector processor (which significantly improves the performance of a vector processor) Genusov et al, does not teach, claim or even suggest the integration of such a block into an E-Unit scalar processor. In fact, the Genusov et al, unit is shown as being a coprocessor type vector processing unit, capable of being coupled (via buses 20 and 22), to a separate scalar processor.

U.S. Pat. No. 4,967,343, to Ngai et al., entitled "Pipelined Parallel Vector Processor Including Parallel Configured Element Processors For Processing Vector Elements In Parallel Fashion", describes a pipelined parallel vector processor in which the vector registers are subdivided into a plurality of smaller registers to facilitate parallel processing and greater throughput. Thus, the Ngai et al. reference is but another example of a pipelined parallel processor used as a coprocessor in association with an E-Unit for supporting scalar instruction processing.

Still other examples of a coprocessor type vector processor that may be coupled to a CPU are described in U.S. Pat. No. 5,038,312, to Kojima, entitled "Data Processing System Capable Of Performing Vector/Matrix Processing And Arithmetic Processing Unit Incorporated Therein", and in U.S. Pat. No. 5,029,969, to Izumisawa et al., entitled "Computer System For Directly Transferring Vector Elements From Register To Register Using A Single Instruction".

U.S. Pat. No. 5,008,812, to Bhandarkar et al., entitled "Context Switching Method And Apparatus For Use In A Vector Processing System", describes a a data processing system that includes instruction decoding means for routing vector instructions to vector processing means and scalar instructions to separate scalar processing means. The processor described has a single instruction unit; but still has two separate execution units.

U.S. Pat. No. 5,073,970, to Aoyama et al, entitled "Vector Processing Apparatus Allowing Succeeding Vector Instruction Chain Processing Upon Completion Of Decoding Of A Preceding Vector Instruction Chain", describes a vector processing apparatus that includes separate vector and scalar processing apparatus (further including separate instruction decoders). The reference does not, however, teach, claim or even suggest integrating the scalar and vector processing functions in a single E-Unit.

Another example of a pipelined functional unit, in particular a pipelined floating point adder, is described in U.S. Pat. No. 4,994,996, to Fossum et al., entitled "Pipelined Floating Point Adder For Digital Computer". The adder taught in the reference is used in present day vector processing facilities; not in an E-Unit having an integrated vector processing capability.

Other references which may be used to exemplify the present state of the art are U.S. Pat. No. 4,949,247, to Stephenson et al., entitled "System For Transferring Multiple Vector Data Elements To And From Vector Memory In A Single Operation", which describes a vector register implementation that provides high bandwidth; and U.S. Pat. No. 4,928,238, to Sekiguchi, entitled "Scalar Data Arithmetic Control System For Vector Arithmetic Processor", which describes an improved vector processor; not an integrated scalar and vector instruction processor.

In view of the present state of the art as exemplified by the aforementioned commercially available system and systems described in the references set forth hereinabove, it would be desirable to be able to provide (a) methods and apparatus which facilitate the integration of a vector facility into an E-Unit; (b) methods and apparatus for integrating a vector operation capability into an E-Unit to support the processing of scalar instructions in a single instruction single data ("SISD") and/or multiple instruction single data ("MISD") mode of operation, together with supporting a single instruction multiple data ("SIMD") mode (vector mode) of operation using the same hardware and a single instruction path and a single data path; (c) an improved CPU that includes an E-Unit having a vector processing system integrated therein (in addition to normal scalar instruction processing capabilities commonly supported by such units); (d) improved methods (for use in general purpose digital computing systems), for processing a stored program that includes both vector and scalar type instructions; and (e) an improved execution unit per se (something less than an entire CPU), built in accordance with the teachings of the invention, that supports both vector and scalar data processing using single data and instruction paths.

SUMMARY OF THE INVENTION

Accordingly, it is an object of the invention to provide methods and apparatus that facilitate the integration of a vector facility into an E-Unit to reduce hardware costs, processing time and to reduce the number of instruction and data paths required to support the processing of both vector and scalar instructions.

It is a further object of the invention to provide methods and apparatus for integrating a vector operation capability into an E-Unit to support the processing of scalar instructions in a single instruction single data ("SISD") and/or multiple instruction single data ("MISD") mode of operation, together with supporting a single instruction multiple data ("SIMD") mode (vector mode) of operation using the same hardware and a single instruction path and a single data path.

Further yet, it is an objective of the invention to provide an improved CPU that includes an E-Unit having a vector processing system integrated therein (in addition to normal scalar instruction processing capabilities commonly supported by such units).

Still further, it is an object of the invention to provide improved methods (for use in general purpose digital computing systems), for processing a stored program that includes both vector and scalar type instructions.

Yet another object of the invention is to provide an improved execution unit per se (something less than an entire CPU), built in accordance with the teachings of the invention, that supports both vector and scalar data processing using single data and instruction paths.

According to one aspect of the invention, the vector processing capability may be integrated into an E-Unit designed to support scalar instruction processing by (a) pipelining the fixed point and floating point instruction functional units (in the E-Unit), that are required to implement the vector instruction set; (b) adding a set of vector registers to the architected data registers contained in the E-Unit; (c) modifying E-Unit control logic to decode both vector and scalar instructions; and (d) enhancing the E-Unit's load and store unit bandwidth capability to support the transfer of the contiguous blocks of data normally associated with vector processing.

According to a further aspect of the invention a method for processing a stored program that includes both vector and scalar type instructions, comprises the steps of: (a) fetching instructions from the stored program; (b) decoding each instruction fetched to determine instruction type and the address of any required operand; and (c) transferring any required operand, (independent of instruction type), and instruction type information determined in step (b), to an integrated execution unit, that includes a single load unit, a single instruction queue, a set of pipelined functional units that are capable of executing either vector or scalar instructions, a single store unit and a set of architected data registers, including both vector and scalar data registers, for execution.

Yet another aspect of the invention is directed to a central processing unit for a computing system that includes memory means capable of storing a program that includes both vector and scalar instructions, comprising: (a) an instruction unit including means for fetching instructions from the storage means, decoder means for identifying fetched instructions as vector or scalar instructions, address generation means for generating the address of any storage operand required by the decoded instruction, and means for passing control of a decoded instruction to an execution unit with integrated vector and scalar instruction processing capability; and (b) an execution unit with an integrated vector and scalar instruction processing capability.

According to a preferred embodiment of the invention, the execution unit with an integrated vector and scalar instruction processing capability further comprises: (a) a single load unit; (b) a single instruction queue; (c) a set of pipelined functional units that are capable of executing either vector or scalar instructions; (d) a single store unit and (e) a set of architected data registers, including both vector and scalar data registers.

The invention features a hardware cost savings over prior art computing systems that require separate scalar and vector processing facilities. In particular, the hardware duplicated in a vector coprocessor presently attached to a CPU containing a scalar instruction processor embodied in an E-Unit, is eliminated. Other features of the invention include reduced instruction processing time resulting from not having to determine which processing facility (the E-Unit or vector coprocessor) is to receive an instruction image from the CPU's I-Unit, and a reduction in the number of instruction and data paths required to support the processing of both vector and scalar instructions.

These and other objects, embodiments and features of the present invention and the manner of obtaining them will become apparent to those skilled in the art, and the invention itself will be best understood by reference to the following detailed description read in conjunction with the accompanying Drawing.

DETAILED DESCRIPTION

Figure 1:
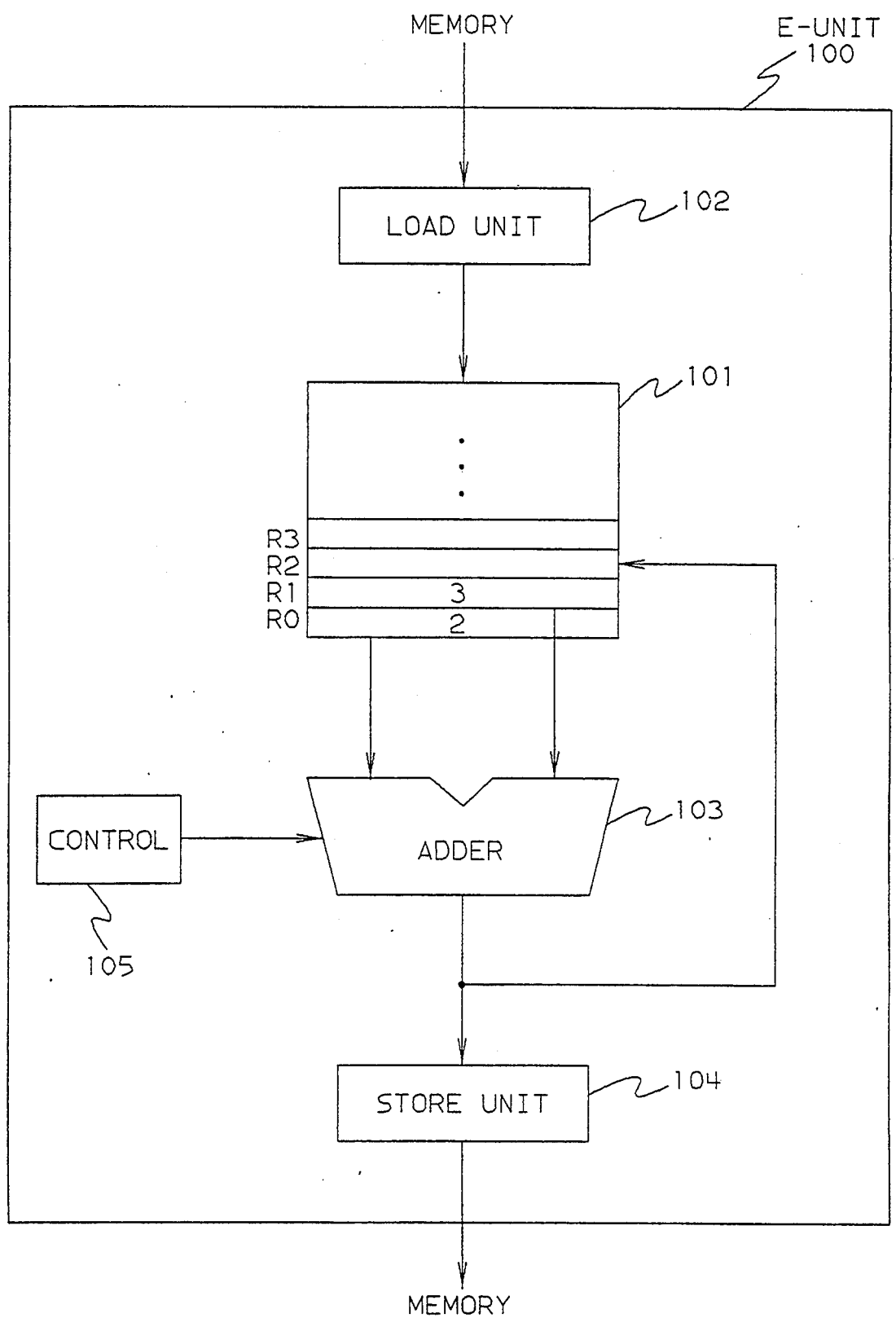
FIG. 1 depicts examples of scalar instruction processing hardware and functions performed by prior art E-Units.
Figure 2:
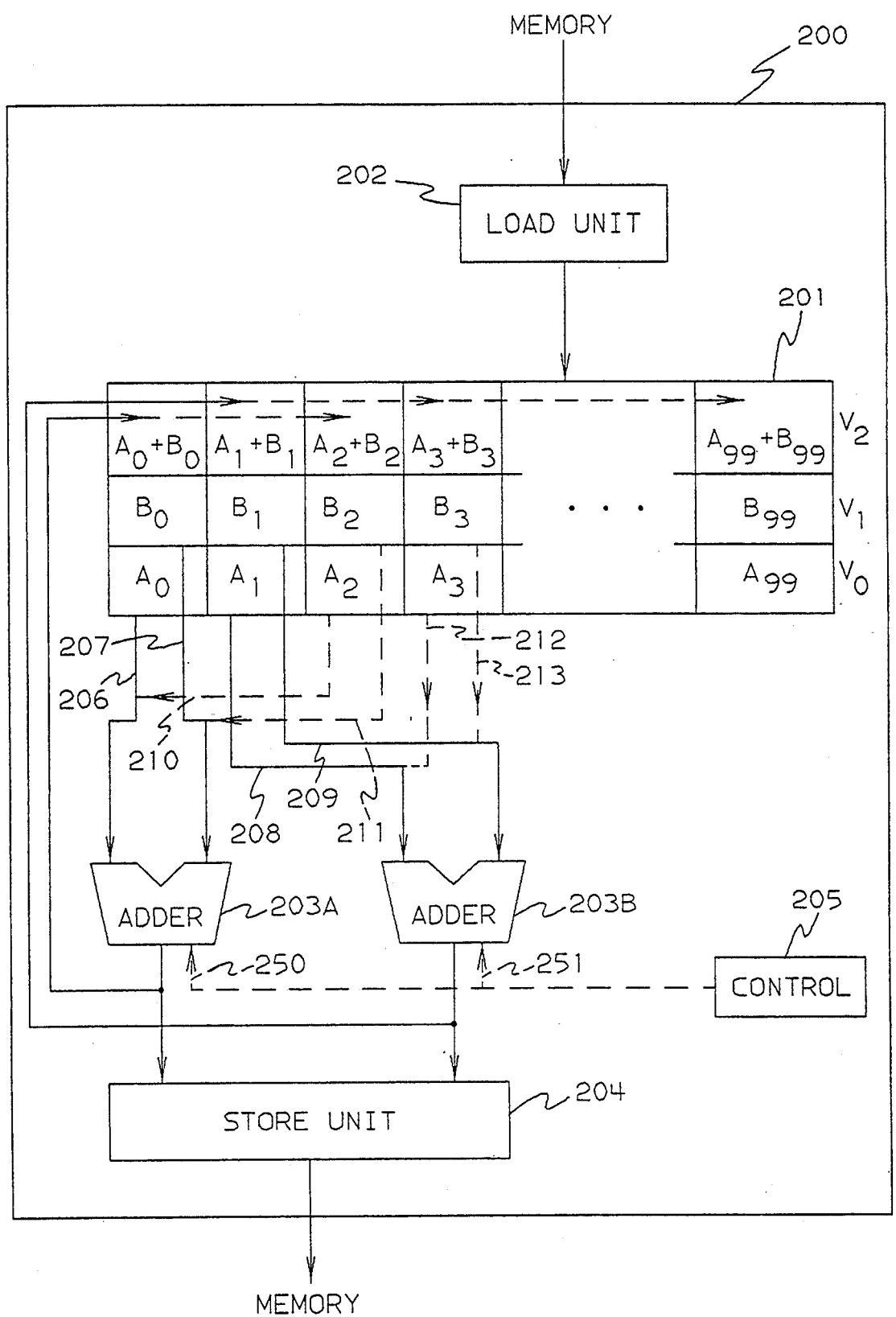
FIG. 2 depicts an example of the vector instruction processing hardware used in, and functions performed by, commercially available vector coprocessors.

As indicated hereinabove, FIGS. 1–2 depict examples of scalar (FIG. 1) and vector (FIG. 2) instruction processing hardware and functions performed by prior art E-Units (for scalar instruction processing) and commercially available vector coprocessors (for vector instruction processing). Although belonging to the prior art, the aforementioned processing techniques are described hereinafter for the sake of completeness and because the concepts are useful in appreciating the invention described hereinafter.

In particular, FIG. 1 depicts a portion of a register pool (101), coupled to a load unit (102), an adder (103) and a store unit (104), in the context of exemplary E-Unit 100. Data is loaded into the register pool by, for example, being transferred from memory by load unit 102, into the registers of register pool 101, in anticipation of some type of scalar operation (in the exemplary case, and ADD), being performed on the data. FIG. 1 also shows, by way of example, the value "2" stored in register R0, and the value "3" stored in register R1.

Assuming an instruction image corresponding to a decoded ADD instruction is passed by the I-Unit of the CPU to the E-Unit, specifying that the operands for the ADD are located in registers R0 and R1 of register pool 101 (using well known instruction processing techniques), the add function is then performed by adder 103. The ADD is actually performed once the functional unit (adder 103) is enabled by E-Unit control means (105). Control means for performing the functions of control 105, i.e., for queuing and scheduling instructions for processing within the E-Unit, are well known to those skilled in the art and are employed in commercially available computer systems such as the aforementioned ESA 9000 system.

The result of the illustrative ADD ("5"), is shown stored in register R2. Subsequently, the result can be transferred to storage (main memory, cache, etc.), via store unit 104.

Depending on the complexity of the operation to be performed, the functional unit enabled in the E-Unit may require more than one machine cycle to process an instruction. For example, although a binary add might only take one machine cycle to perform; a multiply instruction, a floating point add, etc. may require several machine cycles to perform because of, for example, data normalization requirements, etc. The effect of instructions requiring multiple cycles to execute on processing throughput, the relevance of pipelined functional unit architectures in the E-unit contemplated by the invention, etc. will be described hereinafter with reference to FIG. 3.

The type of instruction processing contemplated by FIG. 1 involves a single instruction and a single data unit (the two operands). When an E-Unit is processing this type of instruction and data, the E-Unit is said to be in a SISD mode of operation. This is a scalar instruction mode of operation.

A set of instructions is set forth hereinbelow to illustrate the potentially repetitive nature of scalar instruction processing, and demonstrate in circumstances where having a vector instruction processing capability would be beneficial. In particular, the following example relates to adding 100 pair of numbers, with each pair of operands being located in corresponding locations in two columns, referred to hereinafter as column A and column B (each having 100 entries). The "columns" are presumably stored in main memory.

A scalar instruction program to accomplish the ADD of the 100 pair of numbers might look like:
DO 1 TO 100
    LOAD R0, COLUMN A
    LOAD R1, COLUMN B
    ADD R0,R1
    STORE With reference to FIG. 1, the scalar instruction program set forth hereinabove would cause load unit 102 to first load selected registers in register pool 101 (in particular, registers R0 and R1 using the illustrative program), with the operand located at location 1 in columns A and B (from memory); adder 103 would perform the ADD operation using the two operands (under control of unit 105); with the result being placed back into the register pool (for example in register R2). The STORE instruction would then cause store unit 104 to store the results of the ADD back to memory. This ADD operation, according to the program set forth above, would be repeated 100 times, that is until all 100 pairs of numbers are added and the results are stored back in memory.

Certain CPUs have the capacity of performing more then one scalar operation at a time in parallel. Such units would have multiple functional units coupled to the register pool and the E-Unit control means (both referred to hereinabove), where the control unit could enable a plurality of functional units at the same time. This type of scalar processor is said to allow a MISD type mode of operation, and is also well known in the prior art.

FIG. 2 depicts, by way of comparison with FIG. 1, how a vector type of operation may be performed utilizing a prior art vector coprocessor.

In particular, FIG. 2 depicts a portion of a prior art vector coprocessor (200) that includes a register pool (201), further including architected data registers capable of storing vector quantities (in this case all 100 data elements from each of the aforementioned columns). Register pool 201 is otherwise coupled to a load unit (202), functional units (such as, for example, adders 203a and 203b), and a store unit (204); just like register pool 101 depicted in FIG. 1, is coupled to a functional unit, adder and a store unit, except that the functional units depicted in FIG. 2 are assumed to be "pipelined" (as will be explained hereinafter), to support vector processing and parallel operations by the depicted adders. Components 201-205 are, according to prior art vector processing techniques, embodied in a vector coprocessor (like processor 200), which is typically a separate unit attached to a CPU.

FIG. 2 goes on to show the architected data registers in register pool 201 holding data items $A_0$–$A_{99}$, from column A, in register $V_0$; data items $B_0$–$B_{99}$, from column B, in register $V_1$; with the sum of each data item pair $(A_i+B_i)$ being targeted for storage in register $V_2$.

Also shown in FIG. 2, are dashed lines 210–213, which indicate that adder 203a, in this exemplary embodiment of a vector coprocessor, first adds the pair $(A_0,B_0)$, with the data being supplied to adder 203a via links 206 and 207, then the pair $(A_2,B_2)$ is supplied to adder 203a (via links 210 and 211) for processing, etc. In other words, only the "even" subscripted data items stored in registers $V_0$ and $V_1$ are presented to adder to 203a. Meanwhile, adder 203b serves to sequentially add the "odd" subscripted data items stored in registers $V_0$ and $V_1$.

Adders 203a and 203b can be controlled to handle the sequential processing of their assigned (odd or even) data item pairs stored in register pool 201 using control mechanisms (such as control means 205), shown attached to the adders via links 250 and 251 (shown with dashed lines), in a manner that is well known to those skilled in the art and incorporated for example, in the aforementioned, commercially available, ESA 9000 system. Accordingly, the control techniques for performing parallel ADDs and other types of parallel processes in a vector processor will not be further described herein.

Using the hardware and instruction processing techniques described hereinbefore with reference to FIG. 2, the scalar instruction program "loop" set forth hereinabove could be replaced by a single vector ADD instruction, with a vector instruction program to accomplish the ADD of the 100 pair of numbers looking like:
LOAD $V_0$ ($A_0$ TO $A_{99}$)
LOAD $V_1$ ($B_0$ TO $B_{99}$)
ADD $V_0$, $V_1$
STORE Those skilled in the art will readily appreciate that the two load instructions cause the vector registers to be loaded with contiguous blocks of data representing the 100 data items in the exemplary columns A and B; and the vector "ADD" may then operate on the odd and even subscripted data item pairs using hardware such as that depicted in FIG. 2, with the results being placed in register $V_2$ and subsequently stored in memory (as a contiguous data block via store unit 204).

The type of instruction processing contemplated by FIG. 2 involves a single instruction (the vector ADD) and multiple data units (the 100 pairs of data items). When vector coprocessor 200 is processing this type of instruction and data, the coprocessor is said to be operating in a SIMD mode of operation. This is a vector instruction processing mode of operation.

In addition to the parallelism (ability to perform ADDS in parallel using multiple functional units, etc.), depicted in FIG. 2, "pipelining" of functional units is a technique well known to those skilled in the art to speed up processing by not allowing "holes" (time delays in the instruction processing sequence) to be placed in the instruction pipeline that a typical I-unit creates. For the sake of completeness, the concept of pipelining will be briefly reviewed hereinafter with reference to FIG. 3.

Figure 3:
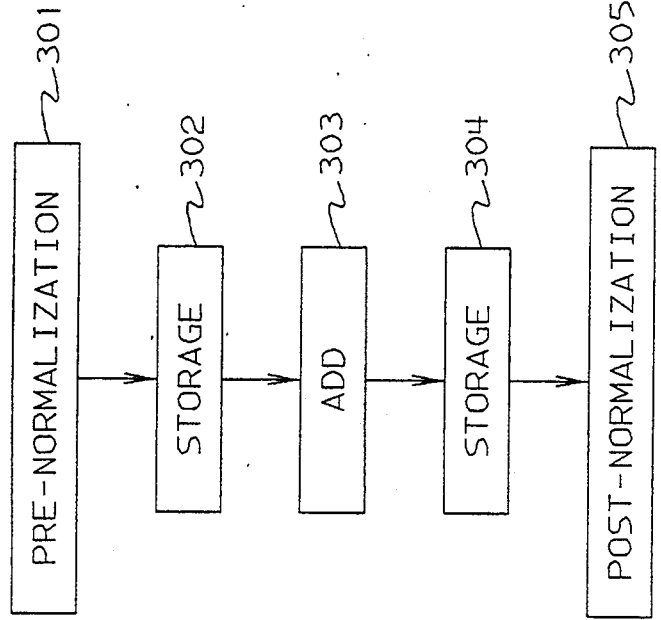
FIG. 3 depicts examples of the prior art concept of instruction pipelining, well known to those skilled in the art, useful in understanding the step of pipelining the fixed point and floating point instruction functional units (in an E-Unit) which, according to one aspect of the invention, is performed when integrating a vector processing facility into an E-Unit to implement a vector instruction set.
Figure 3:
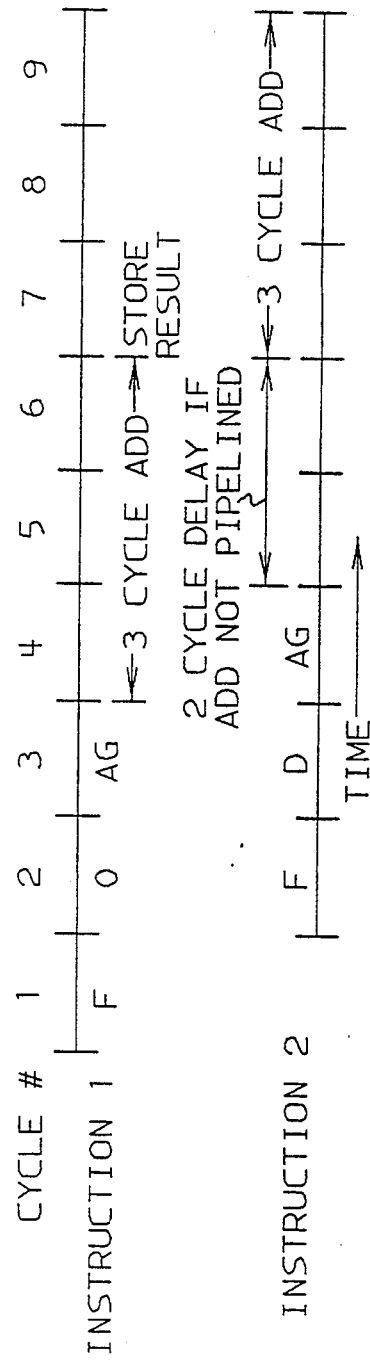

FIG. 3 depicts examples of the prior art concept of instruction pipelining, a concept that is well known to those skilled in the art. The notion of instruction pipelining is useful in understanding the step of pipelining fixed point and floating point instruction functional units (in an E-Unit) to, in accordance with one aspect of the invention, integrate a vector processing facility into an E-unit.

The boxes labeled 301-305 in FIG. 3, may be used to illustrate the instruction pipelining technique used by prior art floating point vector adders, such as those described in several of the patents referred to hereinabove (and other types of functional unit). The objective of this pipelining is, once again, to avoid the occurrence of "holes" (time delays) in an instruction pipeline, such as the pipeline depicted on the time lines in FIG. 3 where the instruction labeled "Instruction 1" is placed into the pipeline first (by an instruction unit which performs the depicted fetch, decode and address generation steps indicated by the labels "F", "D", and "AG", appearing on the Instruction 1 time line); followed by the I-unit placing a second instruction into the pipeline, represented by the "Instruction 2" time line depicted in FIG. 3.

In particular, for the illustrative floating point adder example, after the operands are passed to the functional unit for processing, a pre-normalization step (illustrated at block 301) is required by a floating point adder to be sure that the radix points of the operands are aligned. This is typically accomplished by a shift operation.

After pre-normalization, in a pipelined adder, the normalized data is temporarily stored, as shown at block 302 in FIG. 3, before being presented to the logic that actually adds the two operands together (shown at block 303 of FIG. 3). Following the ADD, the result is again temporarily stored, as shown at block 304, prior to performing a post-normalization operation to put the result in an accepted format (e.g., in a format where the first digit to the right of the decimal point is non-zero). Once again, a shift operation may be used to be perform the post-normalization step.

The example set forth hereinabove illustrates the case where three machine cycles (1 for each shift and 1 for the ADD itself), are required to perform the floating point add.

By making a functional unit pipelinable, one aspect of the invention being described herein contemplates adding the necessary hardware and/or firmware to a non-pipelined unit (normally the type of functional unit included in commercially available E-Units), to allow instruction pipelining in the resulting, modified E-Unit. For example, registers 302 and 304 could be added to a non-pipelined floating point adder to obtain the desired pipelined functional unit that can support vector instruction processing.

The benefit of the additional hardware required to pipeline a functional unit is that (for example), once a first floating point add instruction is in the process of being executed, a second such instruction can be started with at most one cycle (versus three cycle) delay, since, when pre-normalization is completed for the operands to be used by the first instruction (and moved into store 302), a second pre-normalization operation can begin immediately thereafter (for the second instruction), etc. This is because the shift register (or whatever device was used to perform the pre-normalization step) becomes free with the transfer of the normalized data to store 302.

Without the storage elements depicted in FIG. 3, a 3 cycle add, such as the one shown during cycles 4-6 on the time line labelled "Instruction 1" (following the fetch ("F"), decode ("D") and address generation ("AG") steps normally performed by commercially available I-Units), would cause the second instruction ("Instruction 2") to suffer a 2 cycle delay before the non-pipelined functional unit would first become available to process the second instruction.

For all of the aforestated reasons, one aspect of the invention contemplates pipelining functional units that are used to support vector instruction processing, as part of a process for modifying existing commercially available E-Units when integrating a vector processing capability into such units.

Figure 4:
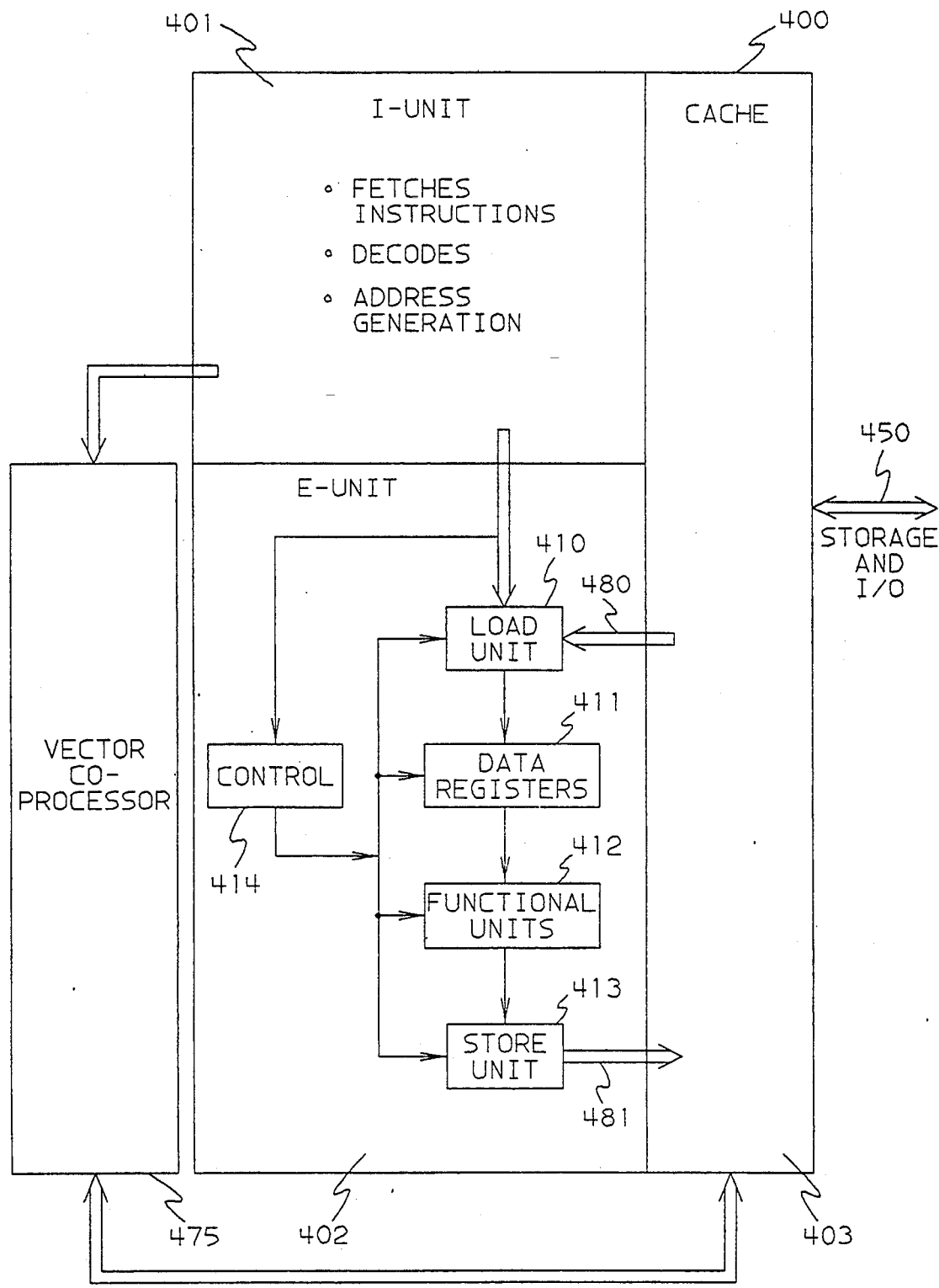
FIG. 4 depicts a prior art arrangement of a CPU, including an I-Unit, E-Unit and cache memory, coupled to a vector coprocessor.

Attention should now be directed to FIG. 4 which depicts, in high level block diagram form, a prior art arrangement of a CPU (400) that includes both the aforementioned I-Unit (401) and E-Unit (402), together with a cache memory (403) shown coupled to storage and other I/O devices. It is to a CPU, such as CPU 400 depicted in FIG. 4, that vector coprocessors are normally attached, with I-Unit 401 routing instruction images to either the vector coprocessor (shown at 475 in FIG. 4), or the depicted E-Unit (unit 402), based on the results of the instruction decode operation performed (together with address generation) for each instruction fetched by I-Unit 401.

In the event that the decode instruction image is passed by I-Unit 401 to E-Unit 402, the hardware depicted in FIG. 1 to support scalar instruction processing is shown again at 410-414 of FIG. 4. As indicated hereinbefore, the hardware structure depicted in FIG. 4 is well known to those skilled in the art, and is used, for example, in the commercially available ESA 9000 system.

Also shown in FIG. 4 are interconnections 480 and 481 between cache memory 403 (and storage via link 450), found in commercially available CPUs. It is via these paths that the actual operands may be fetched from memory (cache or other memory), and enter the data path depicted in FIG. 4, that is the path through units 410-413 of E-Unit 402.

The instruction path through E-Unit 402 goes through control 414, the aforementioned means that controls instruction queueing, functional unit enablement and scheduling, etc.

What is important to note at this junction, is that with a coprocessor arrangement, the E-Unit and any attached vector coprocessor (such as the one described with reference to FIG. 2) each have their own separate instruction and data paths, and a very similar hardware structure (except for the nature of the architected data registers available in the register pools, and the requirement that a vector coprocessor have pipelined functional units and be able (via the coprocessor's load and store unit) to support the higher data bandwidth required to move contiguous blocks of data to and from the coprocessor).

Before indicating the details of how the invention utilizes the similarities between the commercially available E-Unit and vector coprocessor structures described hereinabove to provide an integrated E-Unit capable of supporting vector processing operations, a further look at (and explanation of) the detailed structure of the E-Unit depicted in FIG. 4 will be set forth with reference to FIG. 5. A review of FIG. 5 will better enable those skilled in the art to appreciate the modified E-Unit contemplated by the invention, as described hereinafter with reference to FIG. 6.

Figure 5:
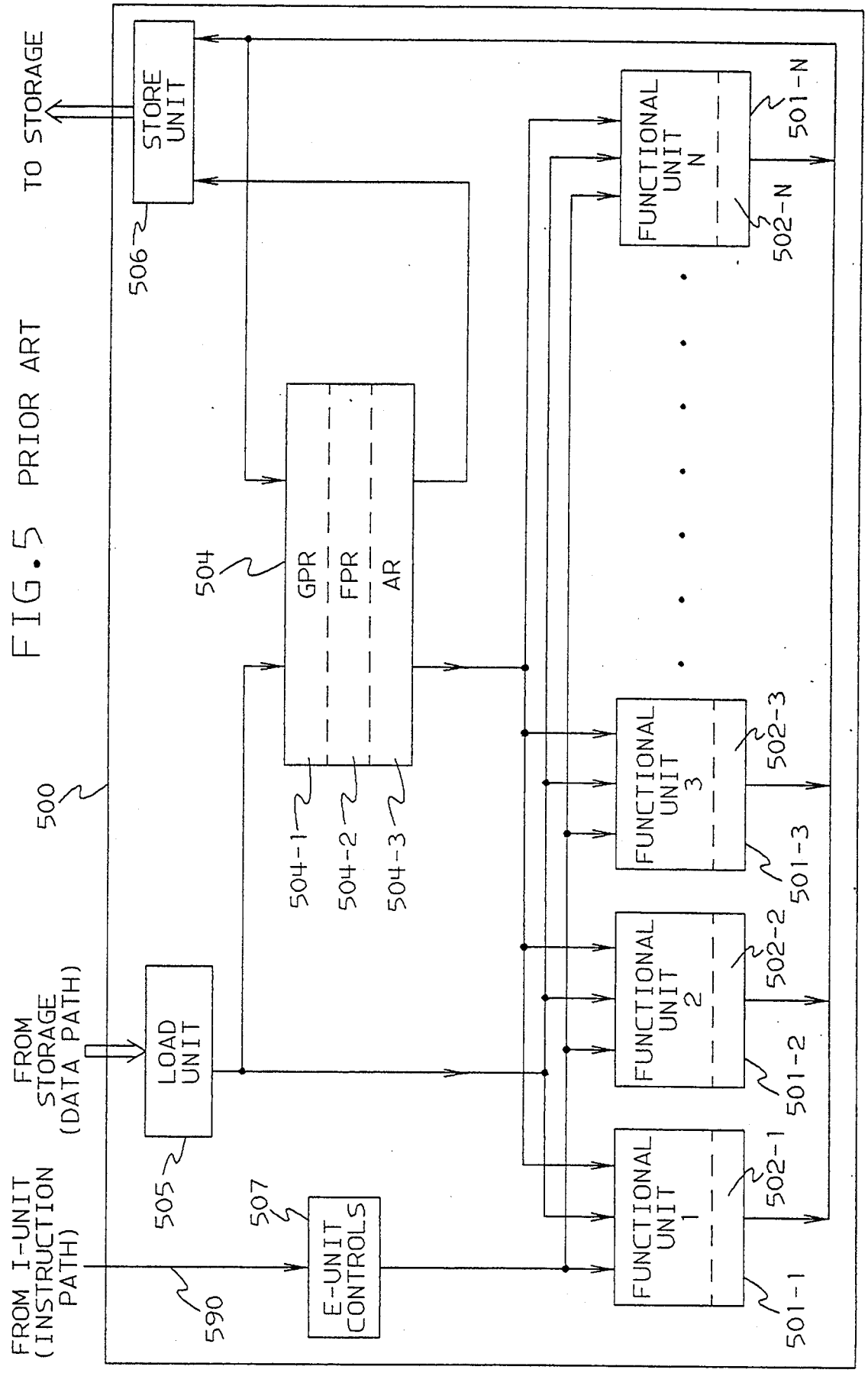
FIG. 5 depicts in greater detail the structure of a prior art E-Unit, such as the E-Unit depicted in FIG. 4, capable of supporting either SIMD or MISD scalar instruction processing.

The E-Unit depicted in FIG. 5 is capable of supporting either SIMD or MISD scalar instruction processing.

In particular, FIG. 5 shows an E-Unit (500), like E-Unit 402 of FIG. 4, to include:

(1) various arithmetic and logical functional units (n of them), such as units 501-1 through 501-n, for supporting either SISD (Single Instruction Single Data) operation or MISD (Multi-Instruction Single Data) operation of the E-Unit (where the functional units are not necessarily pipelined);

(2) internal working registers (within the functional units), shown as 502-1 through 502-n in FIG. 5;

(3) a copy of architected data registers, 504, (possibly the only copy in the CPU), including a set of general purpose registers (GPR), floating point registers (FPR) and access registers (AR) shown at 504-1 through 504-3 respectively;

(4) a load unit (505) to move data from storage to either a data register or one of the functional units;

(5) a store unit (506) to move data to storage from a data register or from one of the functional units; and (6) E-Unit control means (507), in the E-Unit's instruction path, to serve as an instruction queuing device, scheduler, etc.

Each interconnection like (except for link 590) could represent either a single, shared data bus or a set of buses that can simultaneously transfer several data elements. Link 590 represents the instruction path leading to E-Unit control means 507 from the I-Unit.

Figure 6:
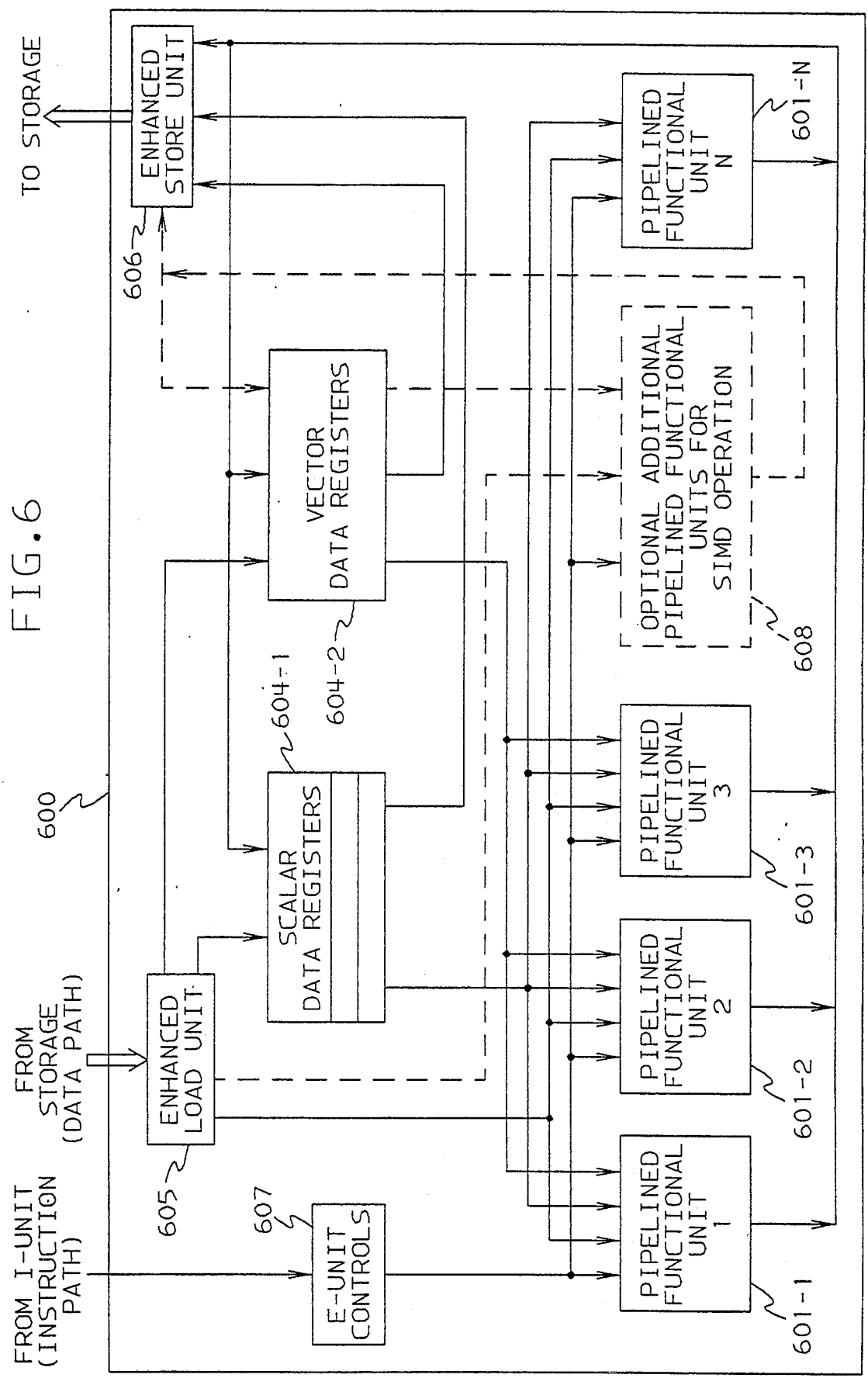
FIG. 6 depicts a preferred embodiment of the invention, namely an E-Unit with a vector capability integrated therein.

Reference should now be made to FIG. 6 which depicts an E-Unit (600) with an integrated vector capability, built in accordance with the teachings of one embodiment of the invention.

By making the following changes and additions to E-Unit 500 of FIG. 5, the E-Unit depicted in FIG. 6 (E-Unit 600) will, according to one aspect of the invention, have the capability of performing vector operations (in addition to scalar operations) at a minimal cost over the cost of the type of E-Unit depicted in FIG. 5.

First, according to one embodiment of the invention, the fixed point and floating point functional units required to implement the vector instruction set, should be "pipelined" (utilizing any one of a number of well known pipelining techniques)for the reasons stated hereinbefore.

Next, a set of vector registers should be added to the set of architected data registers contained in the E-unit. These registers should be capable of storing the contiguous blocks of data associated with vector operations.

It should be noted that the additional registers may be physically added to the original register pool (such as the set of architected data registers (504) depicted in FIG. 5); or may be added as a separate set of registers as shown in FIG. 6. In FIG. 6 the scalar data registers (corresponding to data registers 504 of FIG. 5) are shown at 604-1; while the vector data registers added to the E-Unit are shown separately at 604-2 (in FIG. 6).

Furthermore, according to the invention, the load and store units (shown at 605 and 606, respectively in FIG. 6), need to be enhanced to provide the data bandwidth required for vector operations. Techniques for providing adequate bandwidth to support vector operations are, as indicated hereinbefore, well known to those skilled in the art. Such techniques are employed in commercially available vector coprocessors.

It should be noted that load unit 605 must accept blocks of contiguous data, and hold and transfer the data to the functional units. The transfer rate required is one element per pipe per cycle per instruction.

Store unit 606 must accept one data element per cycle per pipe, and hold and transfer data to storage in contiguous blocks of data as well.

According to the invention, E-unit control means 607 (in the instruction path), must be able to queue, decode and execute vector instructions (in addition to scalar instructions), and must be able to schedule both vector and scalar operations. Once again, well known techniques for performing these functions are within the knowledge of those skilled in the art.

Optionally, additional copies of the fixed point and floating point functional units (pipes) may be included in E-Unit 600 (shown at 608) to improve vector processing performance.

The modified E-Unit architecture contemplated by the invention speeds up instruction processing and reduces costs in several ways.

First, CPU overhead is reduced since the I-Unit only needs to send decoded instruction images to one place, the modified E-Unit. The I-Unit no longer needs to make a decision, for each and every decoded instruction, regarding instruction image routing, i.e., the I-Unit no longer needs to decide weather to route an instruction image to an E-Unit (like E-Unit 500 depicted in FIG. 5), or to a separate vector coprocessor attached to the CPU.

The modified E-Unit (such as E-Unit 600 depicted in FIG. 6), requires only one instruction path and one data path to service both vector and scalar instruction types. This increases the throughput potential in processing stored programs being executed by the computer system that includes a CPU having the modified E-Unit contemplated by the invention.

Furthermore, redundant hardware and control features used in prior art E-Unit/vector coprocessor combinations, are eliminated, leading to lower system cost and the potential for even greater throughput efficiency.

As indicated hereinabove, in present systems the vector facility is usually a separate physical entity with its own load unit, store unit, copy of various architected data registers (both scalar and vector), and fixed point and floating point functional units. This is in addition to the set of these facilities that already exist in the E-unit.

By using this invention, there is considerable savings in hardware and costs. Since the SIMD nature of vector processing places greater demands on data moving, data storage, and data processing parts of the system that does a SISD design, the savings of integrating a vector into a SISD E-unit could be estimated to be scalar component of the shared/duplicated facilities. That is, the scalar load/store units and the scalar fixed point and floating point functional units.

If the E-unit was designed for MISD operation, the modifications for SIMD operation would be small and the net savings would be most of the vector facility except for the vector registers. The added cost is small for the combined features.

What has been described in detail hereinabove are methods and apparatus meeting all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

It is, therefore, to be understood that the claims appended hereto are intended to cover all such modifications and variations which fall within the true scope and spirit of the invention.

What is claimed is:

1. A central processing unit for a computing system, comprising:
   (a) an integrated execution unit capable of executing both vector and scalar only instructions, including:
      (i) a single load unit;
      (ii) a set of pipelined functional units capable of executing either vector or scalar instructions;
      (iii) a single store unit, coupled to said set of pipelined functional units; and
      (iv) a set of architected data registers, including both vector and scalar data registers, coupled to both said load unit and said set of pipelined functional units; and
   (b) a single instruction path, including:
      (i) a single instruction unit, including means for fetching instructions from storage;
      (ii) a decoder connected to said instruction unit and identifying instructions fetched from storage as vector or scalar instructions;
      (iii) address generation means responsive to said decoder for generating an address of a stored operand required by a decoded instruction; and
      (iv) execution unit control means connected to said decoder for controlling said integrated execution unit to perform a decoded vector or scalar instruction, whereby said integrated execution unit can operate on a scalar only instruction or a vector instruction under the control of said execution unit control means.

2. Apparatus as set forth in claim 1 wherein said vector and scalar data registers are combined in a single register pool.

3. Apparatus as set forth in claim 1 wherein said vector and scalar data registers are physically embodied in separate register pools.

4. Apparatus as set forth in claim 1 further comprising a set of non-pipelined functional units.

5. Apparatus as set forth in claim 4 further comprising duplicated functional units to provide enhanced instruction processing throughput.

6. Apparatus a set forth in claim 5 wherein said execution unit control means is coupled to all of said functional units.

7. Apparatus as set forth in claim 6 wherein said execution unit control means further comprises:

(a) a single instruction execution means for both vector and scalar instructions; and
   (b) means for scheduling both vector and scalars only operations.

8. A central processing unit for a computing system, wherein said computing system includes memory means capable of storing a program that includes both vector and scalar instructions, comprising:
   (a) an instruction unit, including means for fetching instructions from said memory means, decoder means for identifying fetched instructions as vector or scalar instructions, address generation means connected to said decoder means for generating an address of any stored operand required by a decoded instruction, and means for passing control of a decoded instruction to an execution unit with integrated vector and scalar instruction processing capability; and
   (b) an execution unit with an integrated vector and scalar instruction processing capability, including a single instruction path, coupled to said instruction unit, and a single data path, coupled to said instruction unit, said execution unit executing vector or scalar instructions on operands as required by a decoded instruction whereby said integrated execution unit can operate on a scalar only instruction or a vector instruction, said execution unit with an integrated vector and scalar instruction processing capability further comprises:
      (i) a single load unit;
      (ii) a set of pipelined functional units capable of executing either vector or scalar instructions;
      (iii) a single store unit, coupled to said set of pipelined functional units; and
      (iv) a set of architected data registers, including both vector and scalar data registers, coupled to both said load unit and said set of pipelined functional units.

9. Apparatus as set forth in claim 8 wherein said vector and scalar data registers are combined in a single register pool.

10. Apparatus as set forth in claim 8 wherein said vector and scalar data registers are physically embodied in separate register pools.

11. Apparatus as set forth in claim 8 further comprising a set of non-pipelined functional units.

12. Apparatus as set forth in claim 11 further comprising duplicated functional units to provide enhanced instruction processing throughput.

13. Apparatus a set forth in claim 12 wherein said single instruction path includes execution unit control means coupled to all of said functional units.

14. Apparatus as set forth in claim 13 wherein said control means further comprises:
   (a) a single instruction queue for both vector and scalar instructions; and
   (b) means responsive to said single instruction queue for scheduling both vector and scalar only operations.

* * * * *